United States Patent [19]

Tippmann et al.

[11] Patent Number: 5,112,371
[45] Date of Patent: May 12, 1992

[54] RADIAL FLOW COOLING TOWER

[76] Inventors: Joseph R. Tippmann, HRC-33, Box 8419, Rapid City, S. Dak. 57701; Vincent P. Tippmann, 8605 N. River Rd., New Haven, Ind. 46774

[21] Appl. No.: 686,147

[22] Filed: Apr. 16, 1991

[51] Int. Cl.5 .............................................. B01D 47/00
[52] U.S. Cl. ..................................... 55/233; 55/257.2; 261/111; 261/DIG. 11
[58] Field of Search ...................... 261/DIG. 11, 111; 55/257.2, 233

[56] References Cited

U.S. PATENT DOCUMENTS 3,363,885  1/1968  Meek ................................... 261/111
3,608,873  9/1971  Furlong ............................... 261/111
3,764,121  10/1973  Fordyce ....................... 261/DIG. 11
4,337,216  6/1982  Korsell ....................... 261/DIG. 11

FOREIGN PATENT DOCUMENTS 152245  11/1979  Japan .......................... 261/DIG. 11

Primary Examiner—Bernard Nozick
Attorney, Agent, or Firm—Joseph J. Baker

[57] ABSTRACT

A radial flow cooling tower is disclosed employing a novel circular support structure for housing both a plurality of sections of fill media and sections of a means for entraining fluid droplets and which permit their easy removal for cleaning or replacement. A system is provided for delivering the fluid to be cooled over the fill media and a motor driven fan for drawing air through the fill media as well as through the droplet entraining sections is positioned in an open central area defined by the fluid entraining sections.

1 Claim, 4 Drawing Sheets

RADIAL FLOW COOLING TOWER

BACKGROUND OF THE INVENTION

This invention relates to cooling towers and more specifically to a cylindrical-shaped cooling tower having a radial air flow through both a fill media as well as a fluid droplet eliminator means adjacent and supported in concentric relationship thereto by means of a novel frame structure.

The basic concept of drawing outside air through fill media continuously saturated within a fluid to be cooled, usually water, and then through a device for eliminating water droplets in cooling tower design is well known. The fluid to be cooled contains heat usually absorbed during condensing or other machine cooling operations and is pumped to and distributed over the fill media. The air is moved through the fill media by large fans usually of the squirrel-cage type. The vast majority of these prior art towers for cooling such fluid employ large rectangular-shaped sections of fill media adjacent to a device for removing droplets of fluid from the air which is drawn through both the media and the device by the fans, neither of which can be easily removed for cleaning or replacement.

Another major drawback is the large amount of space cooling towers of the prior art require for the cooling capacity capable of being obtained from them. This usually results from the aforementioned large rectangular shaped fill media area and fluid droplet eliminator devices as well as the housing and blower construction required to insure that sufficient air is drawn through the fill media and eliminator device to effect desired cooling of the fluid.

To overcome the drawbacks of the cooling towers of the prior art and create one that is a more compact and efficient one having high cooling capacity, applicant devised a unique frame structure secured to two concentric base rings which provides a plurality of first and second radially extending open-sided chambers which permits easy removal of both the fill media and droplet eliminator. In each first radially extending chamber is located a section of fill media and adjacent thereto, in the second chamber, is located a section of a device for eliminating any droplets of water entrained in the air being drawn through the fill media as the fluid to be cooled is caused to fall through it by gravity. The eliminator device sections form, by their inside surfaces, an unobstructed cylindrical-shaped open area in which a motor driven fan is mounted. The fan draws outside air through louvered panels surrounding the circular-shaped outer surface of the fill media sections through the fill media and the fluid to be cooled filtering therethrough, through the fluid eliminator device sections where any entrained water droplets are removed therefrom and into the open area from which it is then exhausted out the top of the tower. A pan is provided beneath both the frame structure and the louvered panels to receive the cooled fluid for return either to the source or to be recirculated through the fill media.

It is therefore the primary object of the present invention to provide a compact, highly efficient fluid cooling tower.

It is another object of the invention to provide a novel frame structure which enables the fill media and fluid eliminator device to be arranged in concentric circles to enable the radial flow of air therethrough and permit their easy removal for cleaning or replacement.

It is yet another object of the invention to provide a cooling tower which is of simple design, relatively inexpensive to make and yet, despite its compactness, exhibits a high cooling capacity.

These and other objects and features of the invention will be apparent from references to the following specification including the claims and drawings, all of which disclose a non-limiting embodiment of the invention.

DETAILED DESCRIPTION

Figure 1:
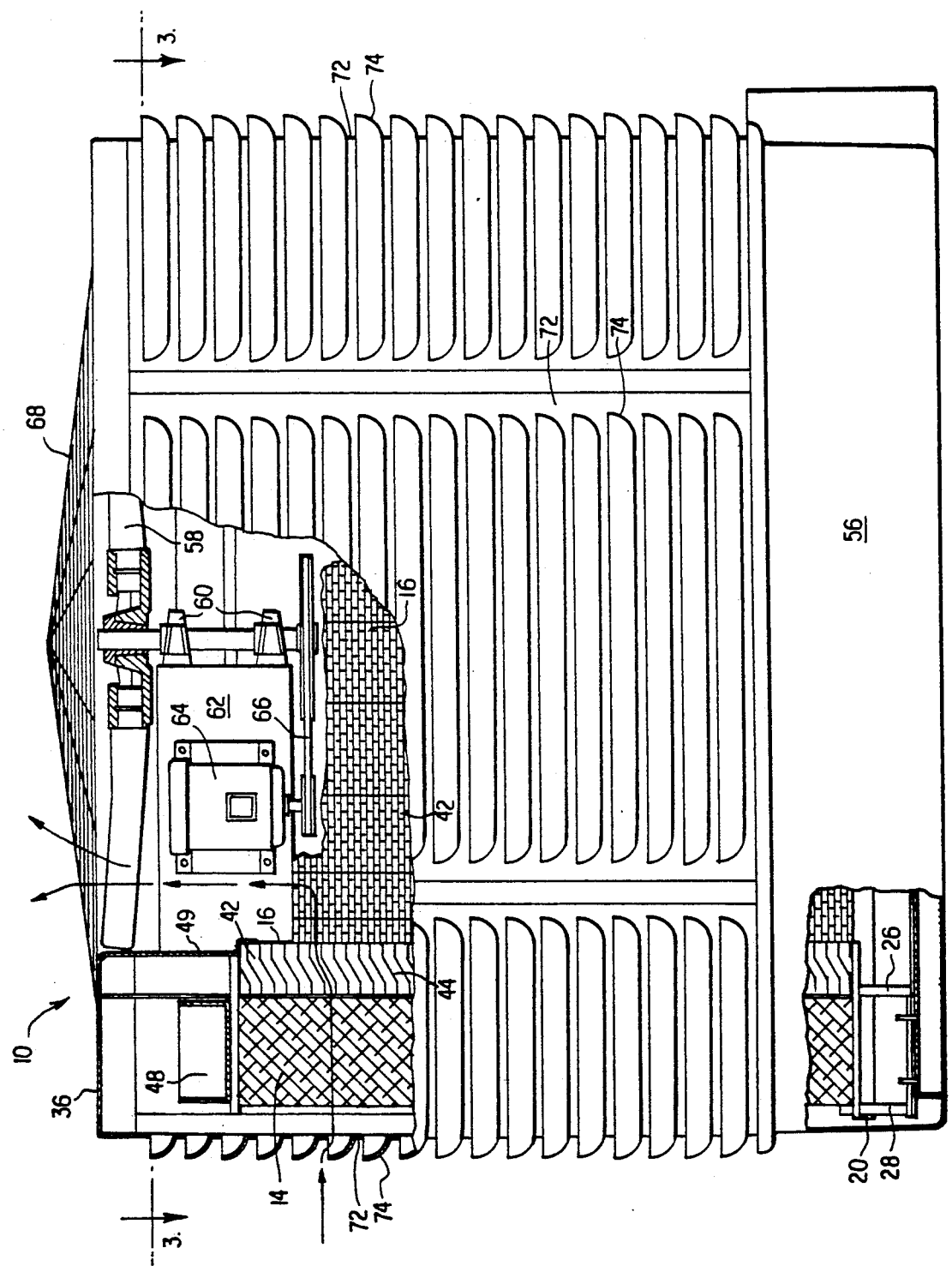
FIG. 1 is an elevational view of the radial flow cooling tower of the present invention partially broken away.
Figure 2:
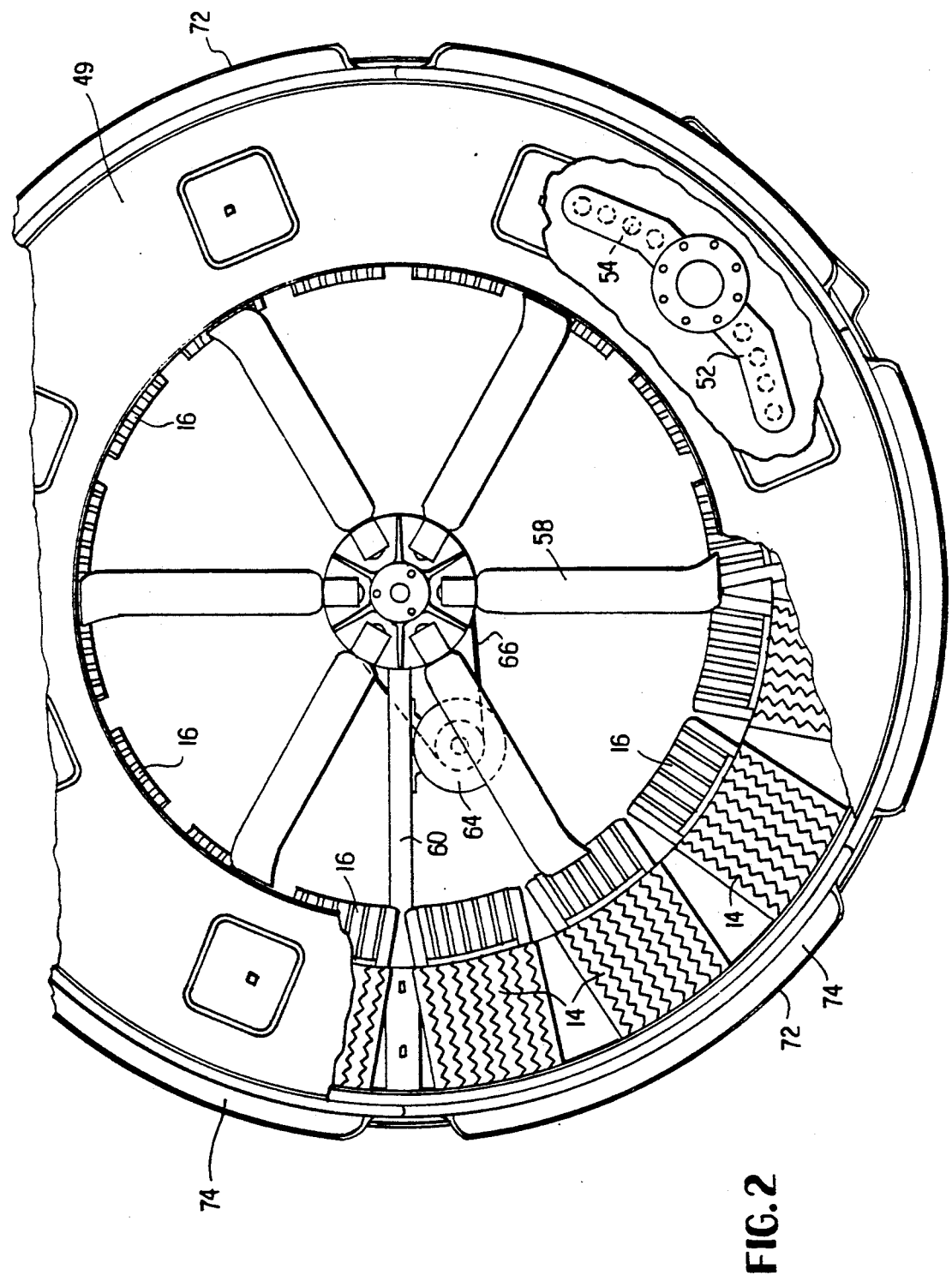
FIG. 2 is a plan view of the cooling tower partially broken away.
Figure 3:
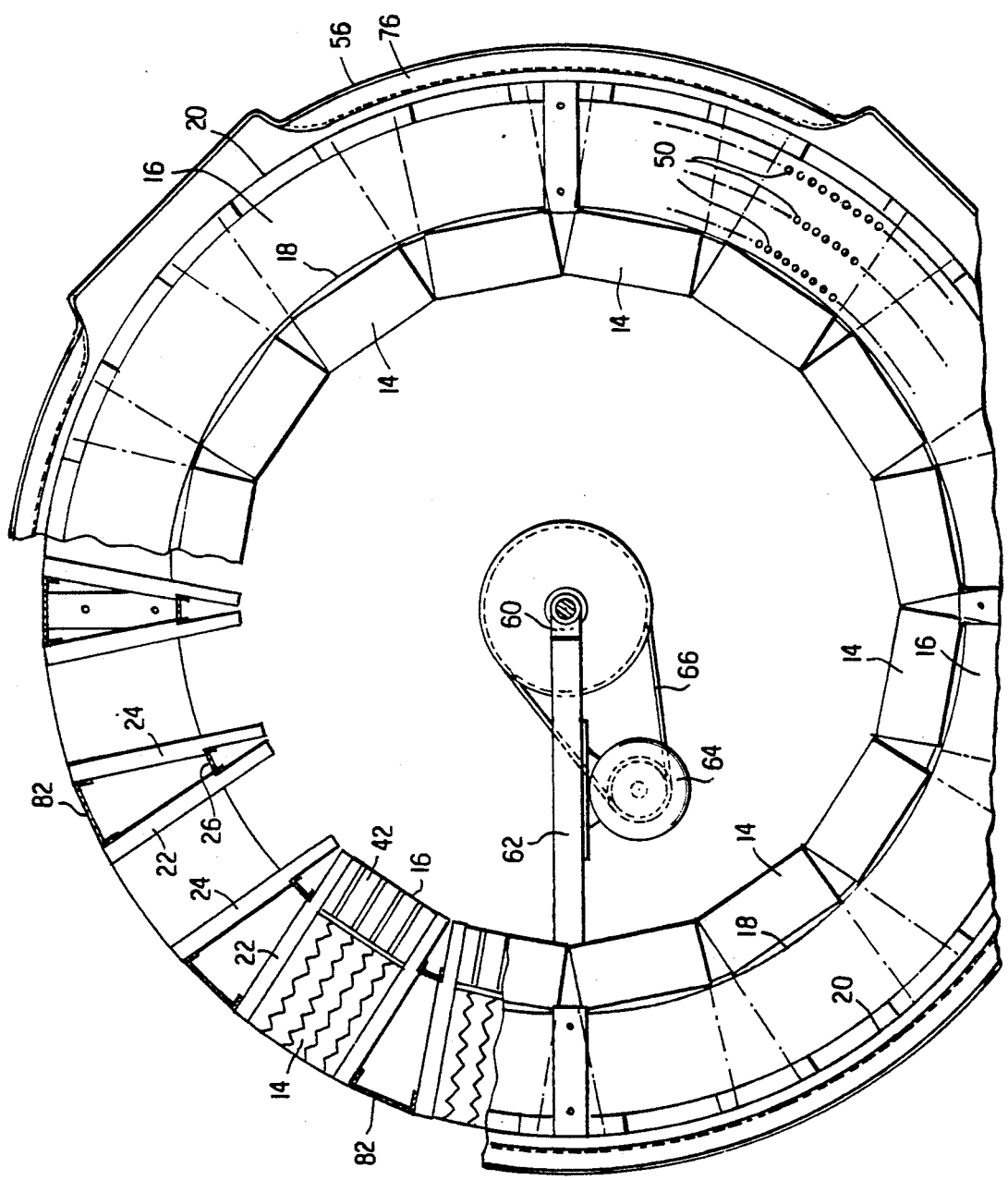
FIG. 3 is a cross-sectional view taken along the lines 3—3 of FIG. 1.
Figure 4:
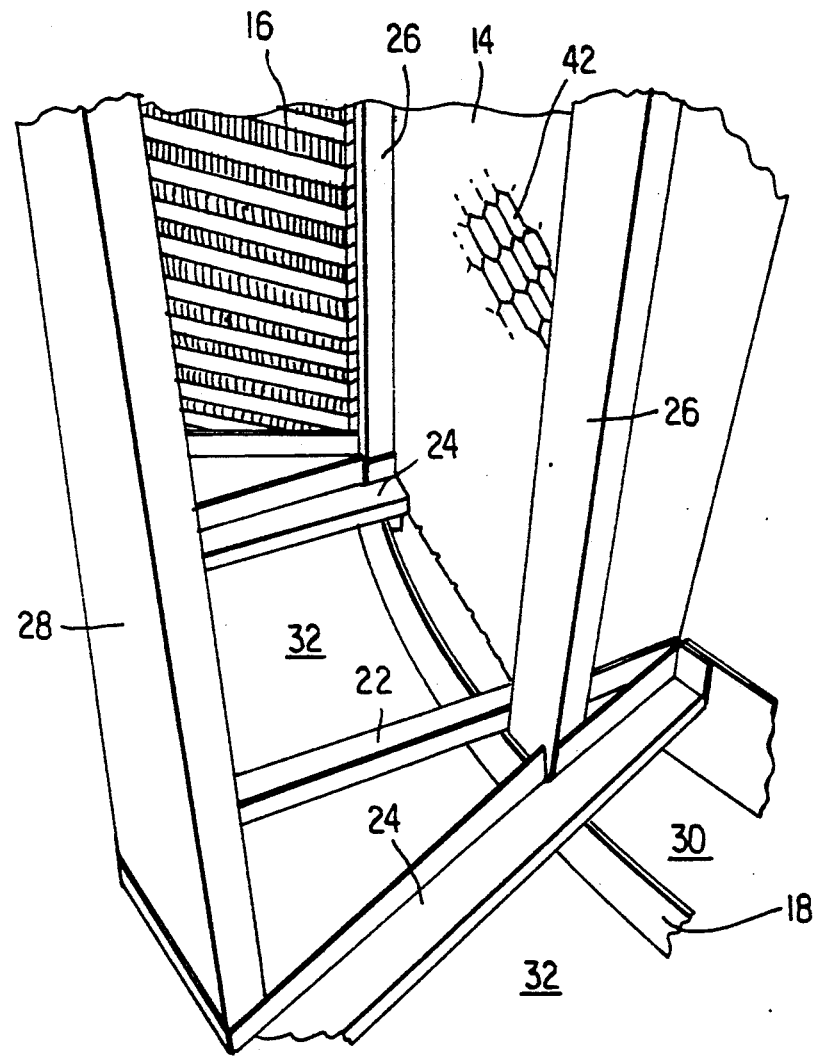
FIG. 4 is a perspective view of the frame members of the present invention.

Referring now to the drawings where like characters of referenced refer to like elements in each of the several views, 10 indicates the radial flow cooling tower of the present invention in FIGS. 1 and 2 which includes generally a circular shape frame 12 holding an outer row of rectangular-shaped sections fill media 14 and an inner row of rectangular-shaped water eliminator sections 16.

The frame 12 comprises an inner horizontally disposed support ring 18 and an outer concentric spacedapart support ring 20. A plurality of horizontally disposed pairs of radially extending lower support members 22, 24 are secured to the inner and outer support rings 18, 20. A plurality of vertically disposed pairs of radially extending support members 26, 28 are positioned between and secured to support members 22, 24 to thereby define a plurality of first and second open sided chambers 30, 32, respectively. An upper support ring 34 is also provided secured to a lifting assembly 36 which acts to stabilize the vertical support members 26, 28.

The rectangular-shaped sections 38 of a honey-comb like structure for eliminating water 16 are positioned in each of the first open sided chambers 30 to thereby form a cylindrical-shaped unobstructed central area 40. The sections 38 are well known in the art and are made by Munters, Inc. of Florida. The structure 38 consists of a multitude of side-by-side passageways 42 as can best be seen by referring to FIG. 1. The passageways 42 are in a S-like shape each with a surface 44 against which any water entrained in air passing through the passageway 42 can impinge and roll back from right to left as viewed in FIG. 1 and out as will be more fully described later. A circular shield 45 is provided above the water eliminator sections 38 to hold them in place.

The rectangular-shaped sections 46 of fill media 14 are positioned in each second open sided chamber 32 substantially adjacent to the water eliminator sections 38. The fill media 46 serves as a multitude of evaporation surfaces against which the fluid to be cooled is caused to run over and thereby be brought into contact with air as will also be more fully explained later. The fill media sections are well known in the art and are also made by Munters, Inc. of Florida.

A circular U-shaped trough 48 is located between the fill media sections 46 and splash shield 49. The trough 48 has a plurality of drain holes 50 formed in the bottom thereof. The fluid to be cooled, usually water as aforementioned, is delivered to a header 52 shown in FIG. 2 positioned above the trough 48. The water is then discharged into the trough from apertures 54 located on the bottom of the header 52. The fluid then drops through drain holes 50 onto the fill media 46 and trickles down through it into a pan 56. The entire frame structure 12, fill media 14, and water eliminator 16 sits above and within the outer confines of the pan 56. A fan blade 58 is located adjacent the upper end of the central area 40 and is rotatably mounted in bearings 60 secured to a support plate 62. An electric motor 64 is also mounted on the support plate 62 for driving the fan blade 58 by way of belt 66. A grill 68 is secured above the fan blade 58 as safety protection. As the fan blade 58 rotates it causes air (see arrows) to be drawn from the outside through the sections 46 of the fill media 14 and then through passageways 42 of the sections 46 of the water eliminator 16 into the central area 40 and out through grill 68. As a portion of the fluid to be cooled evaporates from the wetted surfaces of the fill media 14 it is cooled before dropping into pan 56. Any entrained liquid water entering passageways 42 of the water eliminator 16 will strike upwardly inclined surfaces 44 whereupon it will run back out the entrance of the passageway 42 and down into pan 56 so that fluid loss is kept to a minimum.

A plurality of panels 70 are secured to the vertical support members 28 and are provided with louvered sections 72 which have an outwardly upstanding curved surface area 74. The curved surface area 74 acts to trap any water droplets emanating or splashing from the fill media 14 and causes them to also drain down into the pan 56. A lip 76 on the pan 56 surrounds the lower edge of the panels 70.

The panels 70 are secured by easily releasable fasteners by hand and upon removal of the panels, the novel frame 12 permits the fill media sections 46 and those for eliminating water 38 to be easily withdrawn radially for cleaning or replacement.

Applicant has thus disclosed in detail his cooling tower with its fill media sections and water eliminator sections arranged in a unique frame structure to achieve the radial flow of air therethrough and provide a compact, highly efficient means of cooling a fluid supplied thereto.

What is claimed is:

1. A radial flow cooling tower for liquid comprising:
   (a) a base means having inner and outer concentric spaced-apart support rings,
   (b) a plurality of horizontally disposed pairs of radially extending support members secured to said support rings and a plurality of vertically disposed pairs of support members positioned between and secured to said horizontally disposed pairs of support members to thereby define a plurality of first and second open-sided chambers,
   (c) fill media removably mounted in said first open-sided chambers and extending between said inner and outer support rings,
   (d) liquid eliminator means removably mounted in said second open-sided chambers adjacent said fill media downstream thereof, said eliminator means defining an unobstructed central area,
   (e) a circular trough provided with openings positioned above said fill media and a liquid distribution header in said trough adapted to be connected to a source of liquid to be cooled,
   (f) fan means in said central area for drawing air through said fill media and said water eliminator means to thereby cool said liquid,
   (g) pan means beneath said support means for receiving said cooled liquid, and
   (h) louvered panel means secured to said vertical support members, said panel means having an outwardly upstanding curved surface for trapping liquid droplets emanating from said fill media means and returning said liquid to said pan means.

* * * * *